(12) United States Patent
Morikawa

(10) Patent No.: US 7,216,554 B2
(45) Date of Patent: May 15, 2007

(54) PHYSICAL QUANTITY SENSOR HAVING ENHANCED TEMPERATURE COMPENSATION CAPABILITY

(75) Inventor: Kenji Morikawa, Hekinan (JP)

(73) Assignee: Denso Corporation, Kariya (JP)

( * ) Notice: Subject to any disclaimer, the term of this patent is extended or adjusted under 35 U.S.C. 154(b) by 88 days.

(21) Appl. No.: 11/020,155

(22) Filed: Dec. 27, 2004

(65) Prior Publication Data

US 2005/0160841 A1 Jul. 28, 2005

(30) Foreign Application Priority Data

Dec. 25, 2003 (JP) .............................. 2003-431442

(51) Int. Cl.
*G01L 9/06* (2006.01)
*G01L 19/04* (2006.01)
*G01L 1/16* (2006.01)

(52) U.S. Cl. .............................. 73/862.68; 73/862.381; 73/862.621; 73/862.623; 73/862.625; 73/754

(58) Field of Classification Search ........... 73/862.381, 73/862.471–862.473, 862.621–862.623, 73/862.625–862.627, 862.629, 862.636, 73/862.68

See application file for complete search history.

(56) References Cited

U.S. PATENT DOCUMENTS

| | | | | |
|---|---|---|---|---|
| 4,667,516 A | * | 5/1987 | Schulz | 73/708 |
| 4,674,342 A | * | 6/1987 | Ushijima et al. | 73/862.632 |
| 4,788,521 A | * | 11/1988 | Johnson | 338/3 |
| 4,986,127 A | * | 1/1991 | Shimada et al. | 73/714 |
| 5,780,746 A | * | 7/1998 | Brady | 73/766 |
| 5,864,066 A | * | 1/1999 | Kim | 73/658 |
| 6,143,207 A | * | 11/2000 | Yamada et al. | 252/515 |
| 6,466,151 B2 | | 10/2002 | Nishii et al. | |
| 6,534,430 B2 | | 3/2003 | Makino et al. | |
| 6,819,003 B2 | * | 11/2004 | Farnworth | 257/787 |
| 2001/0020694 A1 | | 9/2001 | Makino et al. | |
| 2002/0060638 A1 | | 5/2002 | Nishii et al. | |
| 2003/0164047 A1 | * | 9/2003 | Fujita et al. | 73/766 |
| 2004/0074306 A1 | * | 4/2004 | Kinoshita et al. | 73/774 |

FOREIGN PATENT DOCUMENTS

| | | |
|---|---|---|
| EP | 1 329 701 A1 | 7/2003 |
| EP | 1 340 970 A1 | 9/2003 |
| JP | A 57-157113 | 9/1982 |

(Continued)

*Primary Examiner*—Hezron Williams
*Assistant Examiner*—David A. Rogers
(74) *Attorney, Agent, or Firm*—Oliff & Berridge PLC

(57) ABSTRACT

A physical quantity sensor according to the invention includes a first member, a second member, a sensing member, a temperature detector, a correcting circuit, and a heat conduction path thermally connecting the sensing member and the temperature detector. The sensing member is interposed in contact between the first and the second members and configured to generate an electrical signal as a function of a physical quantity applied thereto through one of the first and the second members. The temperature detector detects a temperature of the sensing member. The correcting circuit corrects the electrical signal generated by the sensing member using the temperature detected by the temperature detector and outputs the corrected electrical signal. The heat conduction path is formed through the second member such that the second member has a thermal resistance along the path less than that of the first member in an application direction of the physical quantity.

11 Claims, 10 Drawing Sheets

FOREIGN PATENT DOCUMENTS

| | | |
|---|---|---|
| JP | A 08-086700 | 4/1996 |
| JP | A 2001-242019 | 9/2001 |
| JP | A 2002-118467 | 4/2002 |
| JP | A 2002-145664 | 5/2002 |
| JP | A 2002-202209 | 7/2002 |
| JP | A 2003-214962 | 7/2003 |

* cited by examiner

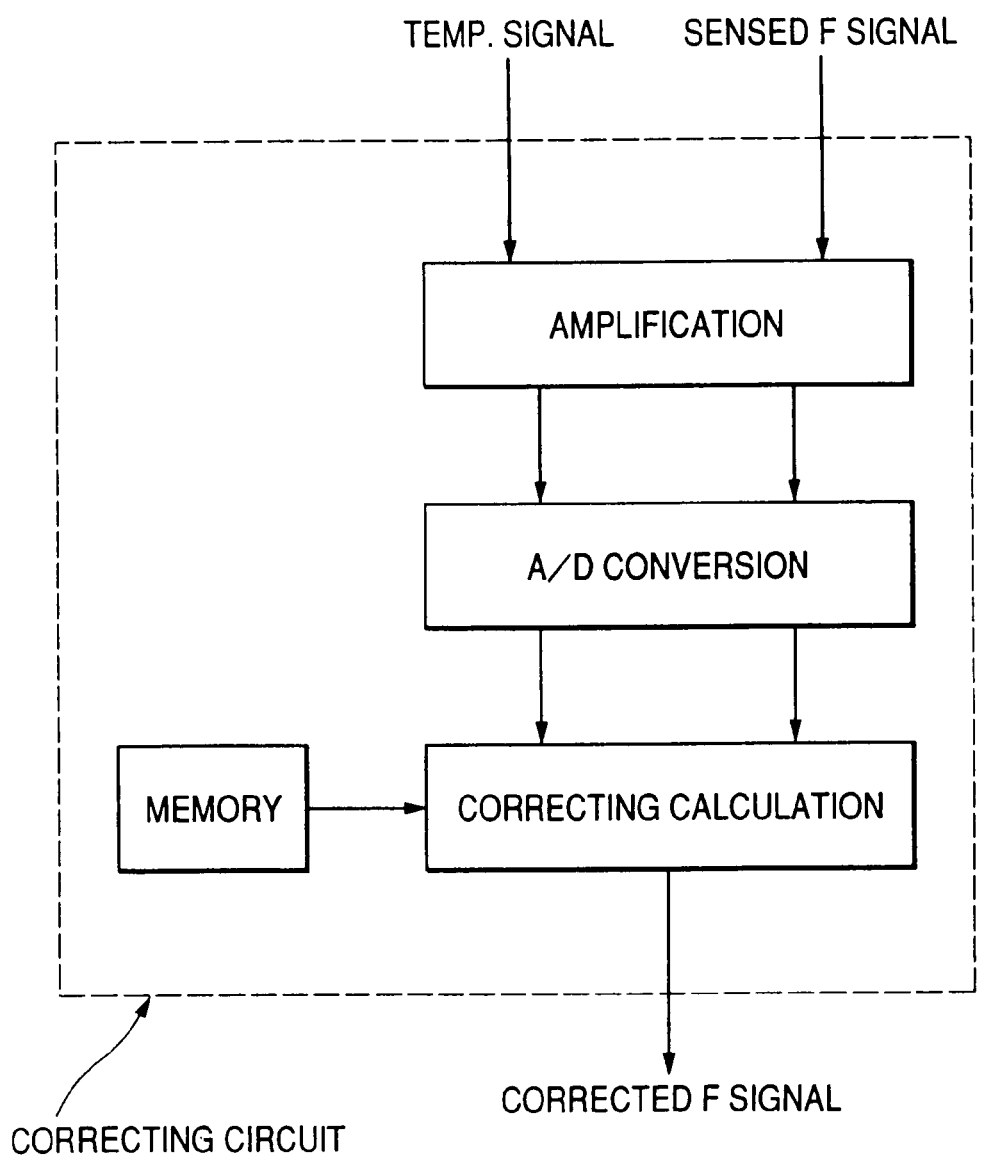

PRIOR ART

PHYSICAL QUANTITY SENSOR HAVING ENHANCED TEMPERATURE COMPENSATION CAPABILITY

CROSS-REFERENCE TO RELATED APPLICATION

This application claims priority from Japanese Patent Application No. 2003-431442, filed on Dec. 25, 2003, the content of which is hereby incorporated by reference into this application.

BACKGROUND OF THE INVENTION

1. Technical Field of the Invention

The present invention relates generally to physical quantity sensors for sensing physical quantities such as force, pressure, torque, velocity, acceleration, impact strength, weight, mass, degree of vacuum, turning effort, vibration, and noise. More particularly, the invention relates to an improved structure of a physical quantity sensor which enhances the temperature compensation capability of the physical quantity sensor.

2. Description of the Related Art

Physical quantity sensors, such as pressure sensors employing pressure-sensitive elements and load sensors making use of piezoresistive materials, have been widely used. The piezoresistive materials here denote materials which have the piezoresistive effect that when a stress, such as a compression stress, a tensile stress, a shearing stress, and a hydrostatic stress, is applied to the material, the electrical resistance of the material changes as a function of the stress.

Generally, a physical quantity sensor includes a physical quantity sensing element that senses a physical quantity as a pressure, generates an electrical signal representative of the sensed pressure, and outputs the generated electrical signal to external devices or circuits.

However, the value of the physical quantity sensed by the physical quantity sensor varies in response to a change in the temperature of the physical quantity sensing element of the sensor. Therefore, to obtain an accurate value of the physical quantity, it is necessary to perform a temperature compensation for the sensed value of the physical quantity.

Accordingly, a number of physical quantity sensors have been configured to detect not only the physical quantity to be sensed but also the temperature of the physical quantity sensing element of the sensor so as to correct the detected value of the physical quantity depending on the detected temperature.

U.S. Patent Application Publication No. 2003/0164047 A1, the Japanese equivalent of which is Japanese Unexamined Patent Publication No. 2003-214962, discloses such a physical quantity sensor.

FIG. 14 shows a sensor from U.S. Patent Application Publication No. 2003/0164047 A1. This sensor has a load sensor 50, which is made of a ceramic material, has a sandwiched structure. The load sensor 50 includes a load detecting element 51 and a pair of temperature compensating elements 52 and 53. All the three elements of the load sensor 50 have the same structure and share a common insulating pedestal 55.

The detection of the temperature of the load detecting element 51 is made by means of the pair of temperature compensating elements 52 and 53. The two temperature compensating elements are arranged to be close to the load detecting element 51 so as to minimize the differences in temperature between the load detecting element 51 and the two temperature compensating elements 52 and 53.

However, in the load sensor 50, there exist two air gaps, which have the widths W5 and W6 respectively, between the load detecting element 51 and the pair of temperature compensating elements 52 and 53. Further, the insulating pedestal 55, which thermally connects the three elements 51, 52, and 53, is made of a material having a low thermal conductivity. Moreover, the three elements 51, 52, and 53 may show different thermal behaviors.

Accordingly, with such an arrangement, it may be difficult to accurately detect the temperature of the load detecting element 51. As a consequence, the load sensor 50 according to the disclosure cannot sense the load with sufficiently high accuracy.

SUMMARY OF THE INVENTION

It is, therefore, a main object of the present invention to provide a physical quantity sensor having an improved structure that ensures high accuracy in detecting the temperature of the physical quantity sensing element of the sensor, thereby imparting high temperature compensation capability to the physical quantity sensor.

According to the invention, a physical quantity sensor includes a first member, a second member, a sensing member, a temperature detector, and a correcting circuit.

The sensing member is interposed in contact between the first and the second members and is configured to generate an electrical signal as a function of a physical quantity applied thereto through one of the first and the second members. The temperature detector detects a temperature of the sensing member. The correcting circuit corrects the electrical signal generated by the sensing member using the temperature detected by the temperature detector and outputs the corrected electrical signal.

In the above physical quantity sensor according to the invention, there is also provided a heat conduction path that thermally connects the sensing member and the temperature detector. The heat conduction path is formed through the second member such that the second member has a thermal resistance along the thermal conduction path which is less than a thermal resistance of the first member in an application direction of the physical quantity.

With such an arrangement, heat can be effectively conducted from the sensing member to the temperature detector through the heat conduction path along which the second member has the lower thermal resistance. As a result, it becomes possible to detect the temperature of the sensing member through detecting the temperature of the temperature detector itself.

The first member of the physical quantity sensor has the higher thermal resistance so that heat from external sources can hardly be conducted to the sensing member through the first member, thus preventing rapid changes in the temperature of the sensing member.

Additionally, even if the heat from external sources is conducted to the sensing member, it will be smoothly conducted to the second member due to the lower heat resistance of the second member, so that the rapid temperature changes of the sensing member can also be prevented.

To achieve the above-described effect, the second member of the physical quantity sensor is preferably made of a material having a thermal conductivity higher than that of the material of which the first member is made._

Also, for the same purpose, it is preferable that the second member has a thickness in the application direction of the physical quantity less than that of the first member.

All the space between the sensing member and the temperature detector is preferably filled with a sealing material, more preferably, in a gel state. The sealing material will function as a medium to thermally connect the sensing member with the temperature detector, thereby further enhancing the heat conduction therebetween.

The correcting circuit of the physical quantity sensor preferably includes a temperature detecting element that serves as the temperature detector of the sensor. Incorporating the temperature detector in the correcting circuit will contribute to miniaturization of the physical quantity sensor and cost reduction of the same.

It is also preferable that the sensing member of the physical quantity sensor is made mainly of a ceramic material and a piezoresistive material, and the first and the second members of the same are each made mainly of a ceramic material. The use of ceramic materials ensures the physical quantity sensor of high strength.

Further, both the sensing member and the first member are preferably made using zirconia as a main component, and the second member is preferably made using at least one of alumina and aluminum nitride a main component. The use of zirconia for the sensing member and the first member ensures those members of high thermal resistance and high fracture toughness, as well as high strength. Both the alumina and aluminum nitride have a high thermal conductivity (e.g., the aluminum nitride has a thermal conductivity of 200 W/mK about 100 times higher than that of zirconia), thereby ensuring the second member of the sensor has the lower thermal resistance.

Furthermore, it is preferable that the first and the second members each comprise an insulating layer disposed on a surface of the sensing member, and the insulating layer of the second member has a thickness in the application direction of the physical quantity less than that of the insulating layer of the first member, and wherein the insulating layer of the second member is made of zirconia. The use of the same material, i.e., zirconia, for all the contacting portions between the sensing member and the first and the second members provides an advantage in improving fabrication efficiency of the physical quantity sensor.

Moreover, the sensing member of the physical quantity sensor is preferably made using $La_{1-x}Sr_xMnO_3$ ($0 \leq x \leq 1$) as the piezoresistive material.

It is also preferable that an ohmic resistance of the sensing member changes as a function of the physical quantity applied to the sensing member, and the sensing member generates the electrical signal depending on the change in the ohmic resistance of the sensing member.

With the structure of the physical quantity sensor that has so far been described, the temperature compensation capability of the sensor is considerably enhanced, so that the accuracy of the physical quantity sensor in sensing the physical quantity is also considerably improved.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings:

FIG. 10 is a block diagram illustrating a configuration of a correcting circuit of a physical quantity sensor according to the invention for performing temperature compensation;

DESCRIPTION OF THE PREFERRED EMBODIMENTS

Figure 1:
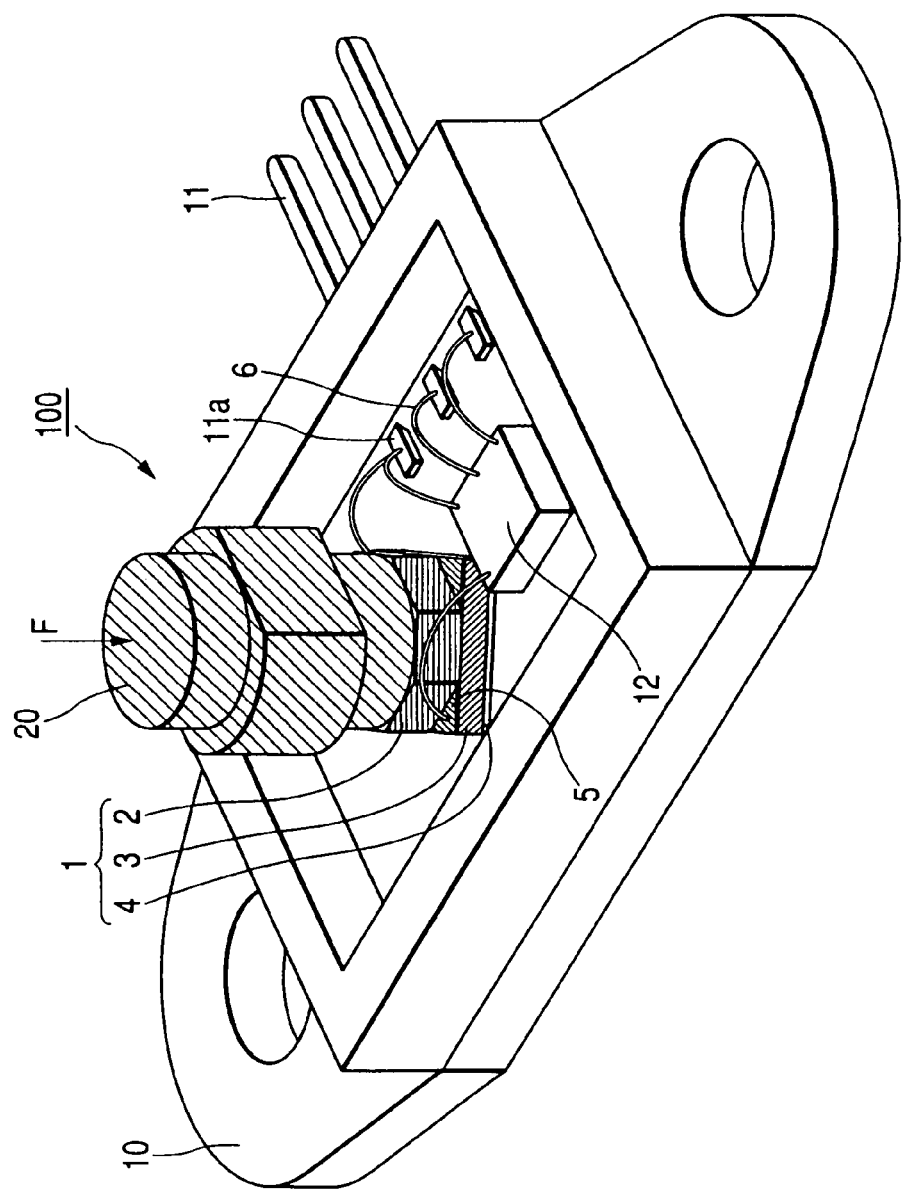
FIG. 1 is a schematic perspective view showing a physical quantity sensor according to the present invention.

The preferred embodiments of the present invention will be described hereinafter with reference to FIGS. 1–12.

It should be noted that, for the sake of clarity and understanding, identical components having identical functions in different embodiments of the invention have been marked, where possible, with the same reference numerals in each of the figures.

FIG. 1 shows an overall structure of a physical quantity sensor 100 according to the invention which includes a physical quantity sensing element 1.

The physical quantity F to be sensed is, for example, a load; it is applied to the physical quantity sensor 100 in the direction indicated by the straight-line arrow.

The physical quantity sensing element 1 includes, as shown in FIG. 1, a first insulating layer 2, a sensing layer 3, and a second insulating layer 4, all of which are stacked in the application direction of the physical quantity F.

On the first insulating layer 2, there is provided a joint 20 for joining the physical quantity sensor 100 to a physical quantity applying device (not shown). The first insulating layer 2 and the joint 20 together constitute the first member of the physical quantity sensor 100 through which the physical quantity F is to be applied to the sensing layer 3. The first insulating layer 2 of the first member electrically isolates the joint 20 from the sensing layer 3.

A case 10, which is made of a ceramic material, supports the physical quantity sensing element 1 against application of the physical quantity F. The second insulating layer 4 and the case 10 together constitute the second member of the physical quantity sensor 100. The second insulating layer 4 of the second member electrically isolates the case 10 from the sensing layer 3.

The case 10 is connected with terminals 11 provided for inputting/outputting electrical signals. Further, on the case 10, a circuit chip 12 is mounted. The terminals 11 each have an end 11a (referred to as terminal end 11a hereinafter) electrically connected with the circuit chip 12 by wire bonding 6.

The major face of the sensing layer 3, on which the first insulating layer 2 is disposed, includes exposed areas that are not covered with the first insulating layer 3. On the exposed areas of the sensing layer 3, there are provided terminals 5 that are electrically connected with the circuit chip 12 and the terminal ends 11a by wire bonding 6. The terminals 5 are made of an Ag-based alloy. The terminals 5 may also be made of other metal materials, such as Au, Pt, Al, Ni, Cu and their alloys, or electrically conductive non-metal materials such as carbon.

The sensing layer 3 is made using a ceramic material as a main component so as to have a sufficiently high strength to endure application of large physical quantities. More specifically, the sensing layer 3 is made mainly of an electrically insulating ceramic material constituting a matrix and a piezoresistive material that is dispersed in the matrix so as to impart electrically conductive properties to the sensing layer 3.

The piezoresistive material may include one or more kinds of substances such as $(Ln_{1-x}Ma_x)_{1-y}MbO_{3-z}$ with a perovskite structure (where, $0.0 < x \leq 0.5$, $0.0 \leq y \leq 0.2$, $0.0 \leq z \leq 0.6$, Ln: rare earth element, Ma: one or more kinds of alkaline earth elements, Mb: one or more kinds of transition-metal elements), $(Ln_{2-u}Ma_{1+u})_{1-v}Mb_2O_{7-w}$ with a layered perovskite structure (where, $0.0 < u \leq 1.0$, $0.0 \leq v \leq 0.2$, $0.0 \leq w \leq 1.0$, Ln: rare earth element, Ma: one or more kinds of alkaline earth element, Mb: one or more kinds of transition-metal elements) and Si.

It is preferable that the piezoresistive material used for the sensing layer 3 is $La_{1-x}Sr_xMnO_3$ ($0 \leq x \leq 1$).

The ceramic material constituting the matrix may include one or more kinds of substances such as $ZrO_2$ (zirconia), $Al_2O_3$, $MgAl_2O_4$, $SiO_2$, $3Al_2O_3 \cdot 2SiO_2$, $Y_2O_3$, $CeO_2$, $La_2O_3$, $Si_3N_4$, and AlN (aluminum nitride).

It is preferable that the ceramic material constituting the matrix is zirconia, which has high strength and high fracture toughness at normal temperatures.

As to the details about the structure and materials of the sensing layer 3, one can refer to Japanese Unexamined Patent Publications No. 2003-214962, No. 2001-242019, and No. 2002-145664, the disclosures of which are totally incorporated herein by reference.

As the sensing layer 3, both the first and second insulating layers 2 and 4 are made mainly of a ceramic material to have a high strength. Also, the ceramic material may include one or more kinds of substances such as $ZrO_2$ (Zirconia), $Al_2O_3$, $MgAl_2O_4$, $SiO_2$, $3Al_2O_3 \cdot 2SiO_2$, $Y_2O_3$, $CeO_2$, $La_2O_3$, $Si_3N_4$, and AlN.

It is essential for the physical quantity sensor 100 according to the invention that the second insulating layer 4 included in the second member has a thermal resistance in the application direction of the physical quantity F less than that of the first insulating layer 2 included in the first member, so that heat can be effectively conducted from the sensing layer 3 to the circuit chip 12.

As is generally known, thermal resistance is a measure of a body's ability to prevent heat from flowing through it.

For example, supposing that the first (or the second) insulating layer of the physical quantity sensor 100 has the shape of a quadratic prism with a thickness d in the application direction of the physical quantity F and a cross-sectional area A perpendicular to the application direction of the same, then the thermal resistance R of the first insulating layer in the application direction of the physical quantity F can be determined by the following equation:

$$R = d/(k \times A) \qquad \text{[Equation 1]},$$

Where k is the thermal conductivity of the material of which the first member is made.

As can be seen from Equation 1, the thermal resistance R decreases with a decrease in the thickness d and an increase in the thermal conductively k or the cross-sectional area A.

Accordingly, it is preferable that the second insulating layer 4 is made of a material having a thermal conductivity higher than that of the material of which the first insulating layer 2 is made, so that the thermal resistance of the second member of the physical quantity sensor 100 can be less than that of the first member of the same.

Also, it is preferable that the second insulating layer 4 has a thickness in the application direction of the physical quantity F less than that of the first insulating layer 2 for the same reason as above.

When the physical quantity F is applied to the physical quantity sensing element 1 via the joint 20, it will be transmitted through the first insulating layer 2 to the sensing layer 3, thus inducing a change in the electrical resistance of the sensing layer 3.

The change in the electrical resistance of the sensing layer 3 accordingly causes a change in the electrical signal generated by the sensing layer 3, which represents the electrical resistance of the sensing layer 3.

The circuit chip 12, which carries an arithmetic circuit, receives the electrical signal from the sensing layer 3 and then calculates the value of the physical quantity F based on the electrical signal.

However, in addition to the application of the physical quantity F, a change in the temperature of the sensing layer 3 can also induce such a change in the electrical resistance of the sensing layer 3.

Figure 8:
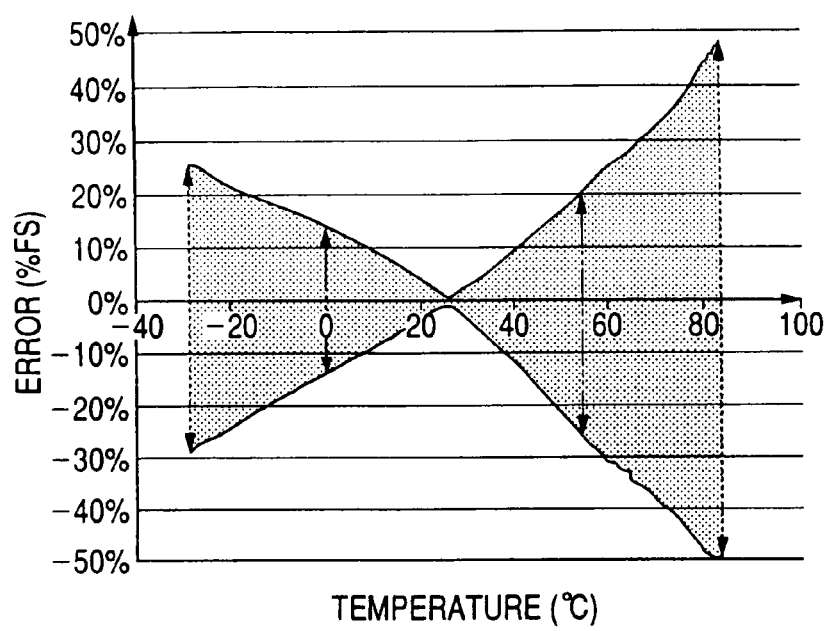
FIG. 8 is a graphical representation showing sensing errors of a physical quantity sensor which occurred without temperature compensation.

More specifically, the electrical signal generated by the sensing layer 3 varies with respect to the temperature of the sensing layer 3, thus resulting in sensing errors of the physical sensor 100 as shown, for example, in FIG. 8.

In FIG. 8, the horizontal axis indicates the temperature of the sensing layer 3, while the vertical one indicates relative sensing errors of the physical quantity sensor 100 with respect to the full scale (FS, i.e., the physical quantity capacity) of the physical quantity sensor 100.

It can be seen from FIG. 8 that the errors in sensing the physical quantity F by the physical quantity sensor 100 vary with respect to the temperature of the sensing layer 3 in an extent as shown in the figure.

Accordingly, to obtain an accurate value of the physical quantity F, temperature compensation is required to correct the sensed value of the physical quantity F.

To this end, the circuit chip 12 further includes a temperature detecting element and a correcting circuit. The temperature detecting element, which serves as the temperature detector of the physical quantity sensor 100, is employed to detect the temperature of the sensing layer 3. The correcting circuit is configured to correct the electrical signal from the sensing layer 3 using the temperature of the sensing layer 3 detected by the temperature detecting element.

The circuit chip 12 is, as shown in FIG. 1, thermally connected with the sensing layer 3 via the second member that includes the second insulating layer 4 and the case 10. In other words, there is provided a heat conduction path formed through the second member, along which heat can be conducted from the sensing layer 3 to the circuit chip 12.

Figure 2:
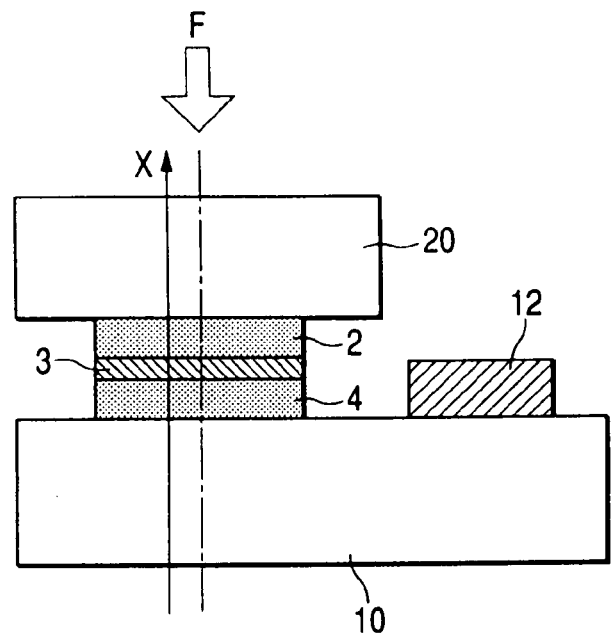
FIG. 2 is a partially cross-sectional side view illustrating a configuration of a prior art physical quantity sensor.

In conventional physical quantity sensors, the sensing layer 3 is, as shown in FIG. 2, interposed in contact between the first and second insulating layers 2 and 4. The two insulating layers 2 and 4 generally have the same shape and are made of the same material, for example, zirconia. Consequently, both the first and second insulating layers 2 and 4 have a high thermal resistance so as to prevent the temperature change of the sensing layer 3 due to the heat conduction between the sensing layer 3 and external sources through the insulating layers.

However, according to the present invention, the second member has a low thermal resistance along the heat conduction path formed therethrough, so that heat can be easily conducted from the sensing layer 3 to the circuit chip 12.

In particular, the second sensing layer 4 of the second member has a thermal resistance in the application direction of the physical quantity F considerably lower than that of the first sensing layer 4.

Consequently, it becomes easy to reach a thermal equilibrium state between the sensing layer 3 and the circuit chip 12, so that the temperature of the sensing layer 3 can be determined through detecting the temperature of the circuit chip 12, instead of directly detecting the temperature of the sensing layer 3.

At the same time, the first member, more particularly the first insulating layer 2 thereof, has a high thermal resistance in the application direction of the physical quantity F. As a consequence, heat from external sources can hardly be conducted to the sensing layer 3 through the first member, thereby preventing rapid temperature changes of the sensing layer 3 due to external influences. Additionally, the high thermal resistance of the first member can be obtained through the use of materials that have low thermal conductivities and suitable configuration of the first member.

Figure 3:
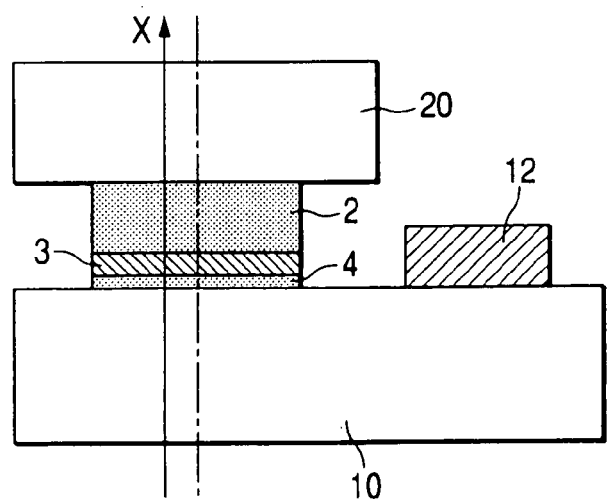
FIG. 3 is a partially cross-sectional side view illustrating a configuration of a physical quantity sensor according to the first embodiment of the invention.

FIG. 3 shows a configuration of a physical quantity sensor 100 according to the first embodiment of the invention. In this sensor 100, both the first and second insulating layers 2 and 4 are made of a material having a low thermal conductivity, such as zirconia that has a thermal conductivity of 2 W/mK. At the same time, the second insulting layer 4 has a thickness in the application direction of the physical quantity F less than that of the first insulating layer 2. Further, the case 10, on which both the second insulting layer 4 and the circuit chip 12 are disposed, is made of a material having a, high thermal conductivity, for example AlN that has a thermal conductivity of 200 W/mK. Accordingly, the second member of the sensor has a lower thermal resistance along the heat conduction path formed therethrough than the second member of the conventional one as shown in FIG. 2.

Figure 7A:
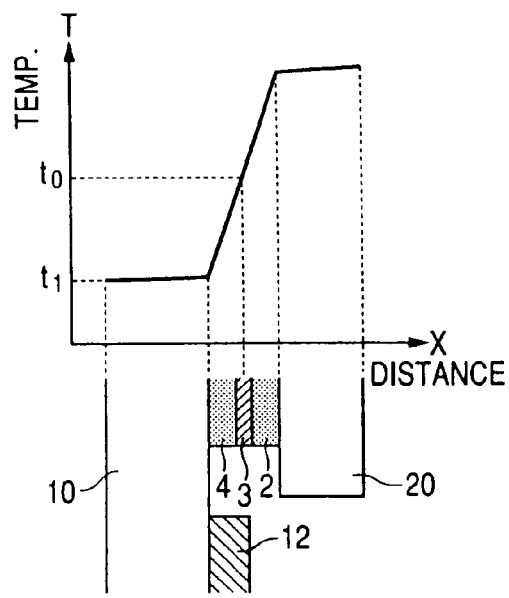
FIG. 7A is a schematic view illustrating the difference in temperature between a sensing layer and a circuit chip in the prior art physical quantity sensor of FIG. 2.
Figure 7B:
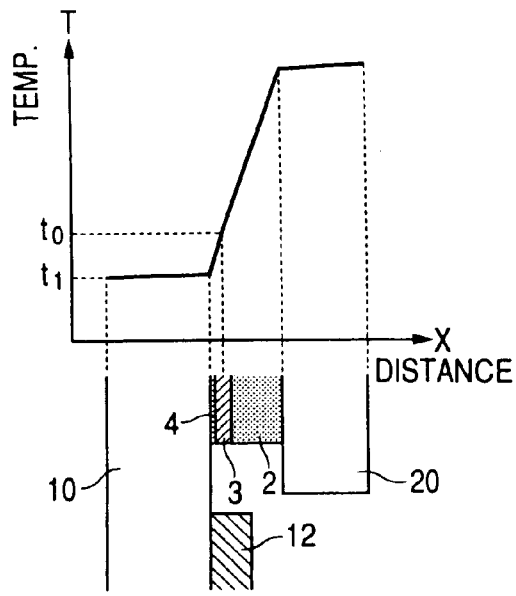
FIG. 7B is a schematic view illustrating the difference in temperature between a sensing layer and a circuit chip in the physical quantity sensor of FIG. 3.
Figure 7C:
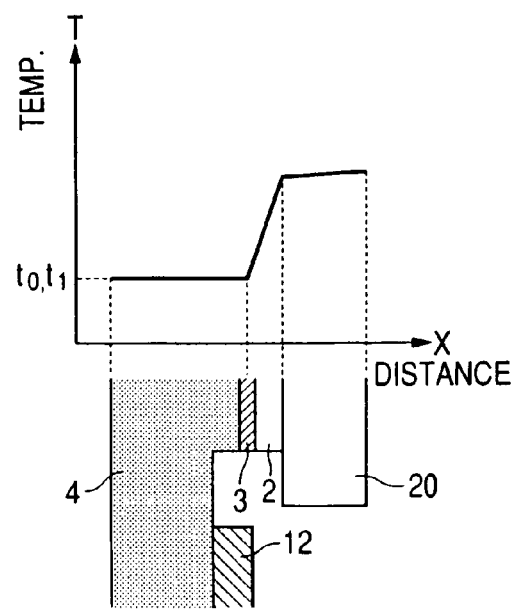
FIG. 7C is a schematic view illustrating the difference in temperature between a sensing layer and a circuit chip in the physical quantity sensor of FIG. 4.

As a consequence, the temperature difference ($t_0-t_1$) between the sensing layer 3 and the circuit chip 12 in the sensor 100 of the first embodiment of the invention, as shown in FIG. 7B, is considerably reduced in comparison with that of the conventional sensor of FIG. 2, as shown in 7A. In those figures, the horizontal axis indicates distance in the X direction, which is opposed to the application direction of the physical quantity F, while the vertical one indicates temperature.

Additionally, in this embodiment, the use of the same material, e.g., zirconia, for all the contacting portions between the sensing layer 3 and the first and the second members provides an advantage in improving fabrication efficiency of the physical quantity sensor 100.

Figure 4:
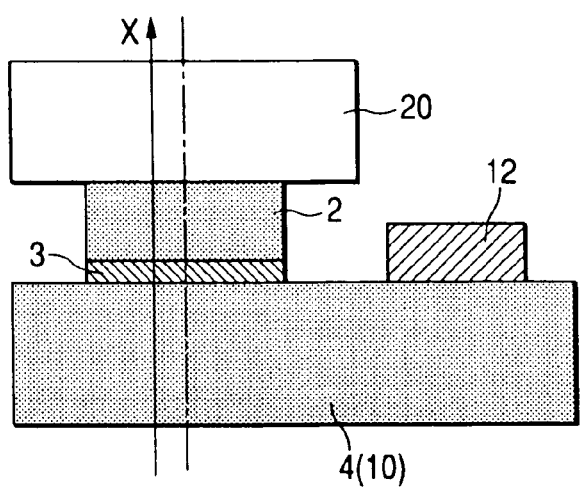
FIG. 4 is a partially cross-sectional side view illustrating a configuration of a physical quantity sensor according to the second embodiment of the invention.

FIG. 4 shows a configuration of a physical quantity sensor 100 according to the second embodiment of the invention. In this embodiment, the second insulating layer 4 and the case 10 are integrated together to form a unitary body that is made of an insulative material having a high thermal conductivity, for example AlN. As a result, as shown in the FIG. 7C, the temperature difference ($t_0-t_1$) between the sensing layer 3 and the circuit chip 12 in the sensor 100 becomes close to zero.

Figure 5:
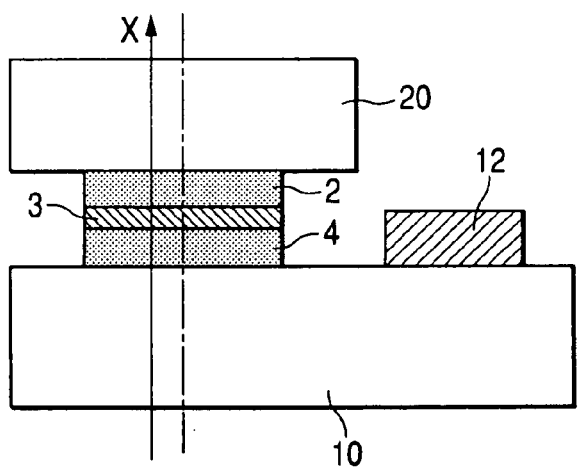
FIG. 5 is a partially cross-sectional side view illustrating a configuration of a physical quantity sensor according to the third embodiment of the invention.

FIG. 5 shows a configuration of a physical quantity sensor 100 according to the third embodiment of the invention. In this embodiment, the second insulating layer 4 is made of an insulative material that has a high thermal conductivity, for example AlN, while the case 10 is made of a material that has a high thermal conductivity without being insulative, such as metal materials including iron.

Figure 6:
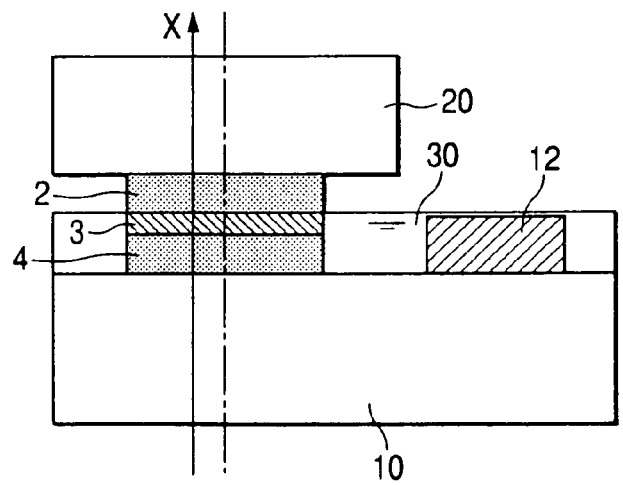
FIG. 6 is a partially cross-sectional side view illustrating a configuration of a physical quantity sensor according to the fourth embodiment of the invention.

FIG. 6 shows a configuration of a physical quantity sensor 100 according to the fourth embodiment of the invention. In this embodiment, all the space between the sensing layer 3 and the circuit chip 12 is filled with a sealing material 30. The sealing material 30 functions as a medium to thermally connect the sensing layer 3 and the circuit chip 12, thereby further reducing the temperature difference between the sensing layer 3 and the circuit chip 12. In addition, the sealing material 30 isolates the sensing layer 3 and the circuit chip 12 from ambient air, thereby protecting them from dust and moisture.

It is preferable that the sealing material 30 is in a gel state. The gel state facilitates formation of the sealing material 30.

In each embodiment of the invention described above, the first member, at least the first insulating layer 2 thereof, has high electrical insulation properties and a high thermal resistance in the application direction of the physical quantity F. To this end, the first member is made, preferably, of zirconia that has a thermal conductivity of 2 W/mK.

Furthermore, the second member and the sealing material 30 are preferably protected by means, for example, of a protection cover (not shown), thereby preventing influence of external heat sources thereon.

With the above configurations of the embodiments of the invention, it becomes possible to accurately determine the temperature of the sensing layer 3 through detecting the temperature of the circuit chip 12, without being influenced by external heat sources.

As to the temperature detection of the circuit chip 12, it can easily be conducted with a temperature detecting element that is included in the circuit chip 12, preferably in the correcting circuit thereof.

For example, a thermistor can be included in the correcting circuit as the temperature detecting element.

It is also possible to utilize at least one of the diodes that already exist in the correcting circuit as the temperature detecting element. The forward voltage of a diode decreases at a certain rate with an increase in the temperature thereof. Therefore, the temperature of the diode can be determined through detecting the forward voltage of the same.

Compared to additionally adding a thermistor to the correcting circuit, the use of existing diodes is more advantageous in miniaturizing the circuit chip 12 and in lowering fabrication cost of the circuit chip 12.

Since the above-described temperature detecting elements are well known in the art, the details about those elements will be omitted hereinafter.

FIG. 10 shows a configuration of the correcting circuit that corrects the electrical signal generated by the sensing layer 3 using the temperature of the circuit chip 12 detected by the temperature detecting element. As shown in the figure, the correcting circuit includes an amplification block, an A/D conversion block, a correcting calculation block, and a memory.

The amplification block receives the temperature signal from the temperature detecting element and the electrical signal from the sensing layer 3 which represents the sensed physical quantity F, amplifies those signals, and outputs the amplified signals to the A/D conversion block.

The A/D conversion block converts the signals from the amplification block from analog into digital form, and outputs the digitized signals to the correcting calculation block.

Then, the correcting calculation block calculates, according to a predetermined correcting algorithm, an accurate value of the physical quantity F based on the signals form the A/D conversion blocks. Constants, which are necessary for the correcting calculation and stored in the memory, are also fed to the correcting calculation block.

In the end, the correction calculation block outs an electrical signal representing the accurate value of the physical quantity F to external circuits or display devices.

It is preferable that all the circuits included in the circuit chip 12 are digital circuits. Otherwise, analog circuit elements used in the circuit chip 12, which show temperature behaviors different from each other, will result in additional sensing errors of the physical quantity sensor 100.

Furthermore, the above A/D conversion block may employ an A/D conversion circuit disclosed in U.S. Pat. No. 6,466,151, the Japanese equivalent of which is Japanese Unexamined Patent Publication No. 2002-118467, the disclosure of which is totally incorporated herein by reference.

Figure 11A:
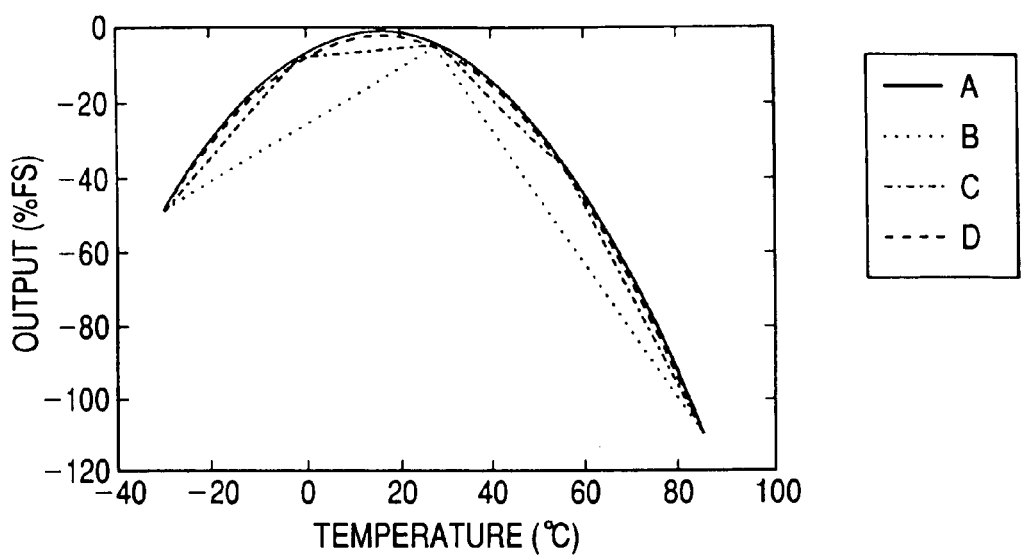
FIGS. 11A–11B are graphical representations illustrating a temperature compensation method used in a correcting calculation of the correcting circuit of FIG. 10.
Figure 11B:
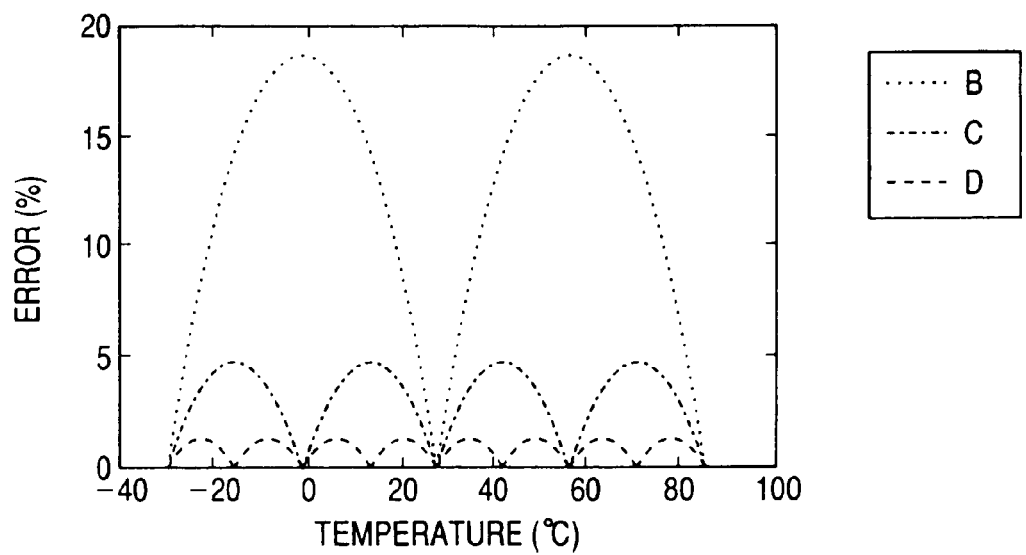

FIGS. 11A–11B illustrate a temperature compensation method used in the correcting calculation described above.

In FIG. 11A, the curve A represents an output drift of the physical quantity sensor 100 according to the invention due to the change in the temperature of the sensing layer 3 in a range of −30 to 80° C. As shown in the figure, the curve A has the shape of an approximately quadratic curve.

On the curve A, a plurality of points are selected first as reference points. Then, those reference points are sequentially connected with straight-lines to obtain an approximated curve. For example, the approximated curve B in the figure is obtained by sequentially connecting the three reference points on the curve A which correspond to the three temperature values of −30, 30, and 85° C., respectively.

Using such an approximated curve, temperature compensation is conducted for the electrical signal generated by the sensing layer 3.

Specifically, when the electrical signal generated by the sensing layer 3 is outputted to the correcting circuit, the temperature signal from the temperature detecting element is also fed to the same circuit.

Then, an estimated output of the sensing layer 3, which corresponds to the temperature represented by the temperature signal, is calculated using an approximated curve, for example the curve B.

Using the estimated output of the sensing layer 3 and the temperature, a correction coefficient is calculated to eliminate the sensing error of the sensing layer 3 corresponding to that temperature.

The calculated correction coefficient is then used to correct the value of the physical quantity F represented by the electrical signal generated by the sensing layer 3, thereby obtaining an accurate value of the physical quantity F.

Figure 9:
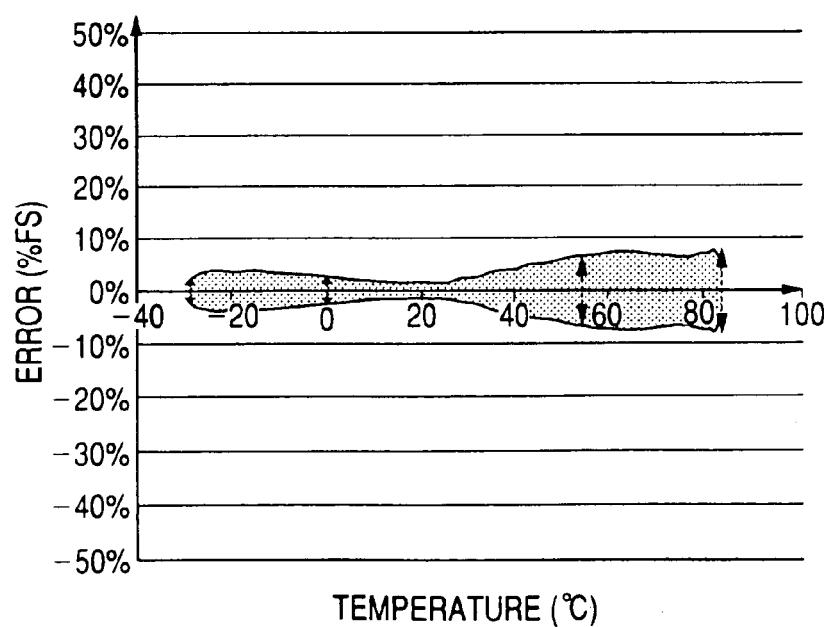
FIG. 9 is a graphical representation showing sensing errors of the physical quantity sensor which occurred with a temperature compensation of using three compensation points.

Through the above temperature compensation process, the sensing errors of the physical quantity sensor 100 are considerably reduced, as shown in FIG. 9, in comparison with those shown in FIG. 8.

In addition, to perform such a temperature compensation process, parameters necessary for obtaining an approximated curve, such as the number of the reference points, are required to be previously stored in the memory of the correcting circuit. Further, correction coefficients corresponding to each temperature in the temperature range, for example, of −30 to 80° C. may also be previously calculated and stored in the memory, thereby facilitating the temperature compensation process.

Different sensors, even if they are fabricated under the same standard, may show different temperature behaviors. Therefore, it is preferable to respectively determine the parameters necessary for obtaining the approximated curves or the correction coefficients for each sensor.

The physical quantity F represented by the electrical signal generated by the sensing layer 3 can be more accurately corrected with increased number of reference points used in obtaining the approximated curve.

For example, in FIG. 11A, five and seven reference points are used for obtaining the approximated curves C and D, respectively, while only three reference points are used for the curve B as described above.

As a result, using the curves C and D, the sensing errors of the physical quantity sensor 100 are considerably reduced, as shown in FIG. 11B, in comparison with the case of using the curve B.

Figure 12:
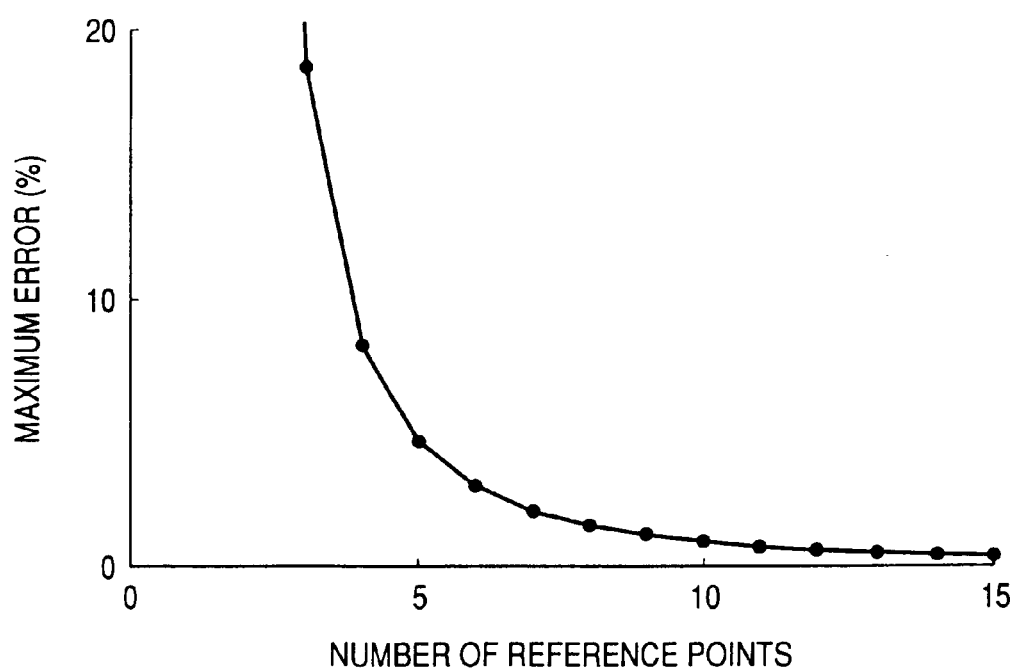
FIG. 12 is a graphical representation illustrating the relationship between the number of temperature compensation points and the resultant maximum sensing error of a physical quantity sensor according to the invention.

Further, FIG. 12 shows a relationship between the number of reference points and the resultant maximum sensing error of the physical quantity sensor 100 in the temperature range described above. As can be seen from the figure, the maximum sensing error of the sensor 100 decreases as the number of the reference points increases, thereby improving sensing accuracy of the physical quantity sensor 100.

It should be noted that the present invention is not limited to the above-described specific temperature compensation method. Other temperature compensation methods known in the art may also be applicable to the physical quantity sensor 100 according to the invention.

Figure 13:
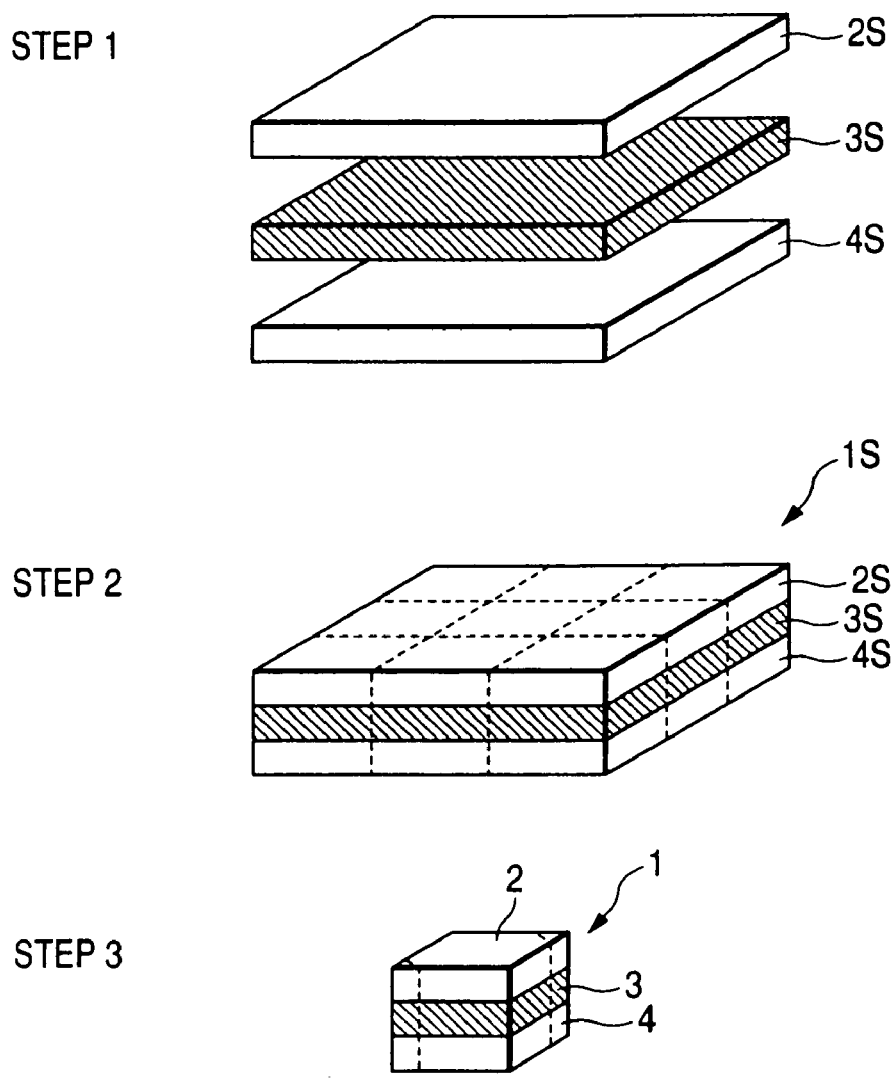
FIG. 13 is a schematic perspective view illustrating a method of fabricating a physical quantity sensor according to the invention.
Figure 14:
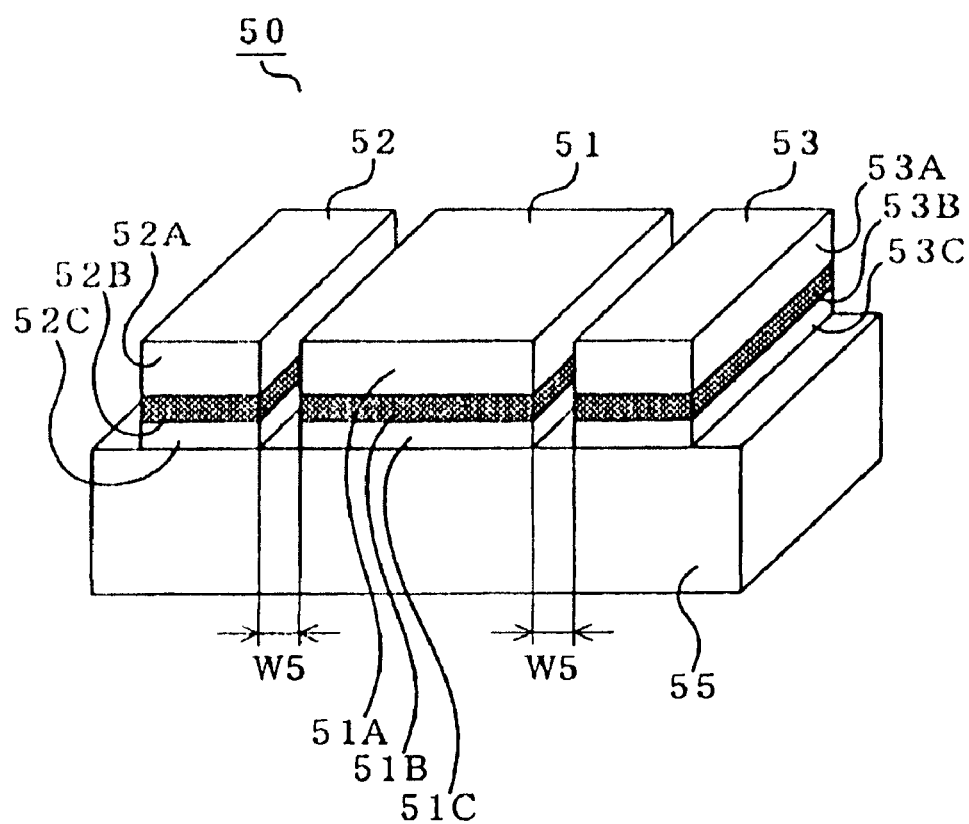
FIG. 14 is a perspective view illustrating a conventional load sensor.

FIG. 13 illustrates a method of fabricating a physical quantity sensor 100 according to the present invention.

Fabrication of the physical quantity sensor has been conducted by the following steps.

In Step 1, powders of a piezoresistive material of $La_{0.62}Sr_{0.38}MnO_3$ and a ceramic material of 12 wt % $CeO_2$ added $ZrO_2$ for constituting the matrix were blended at a given ratio, for example, of 3:7 to provide a blended powder for forming the sensing layer 3. The blended powder was then mixed and crushed for four hours in a pulverizing mill, for example a ball mill, and dried to obtain a mixed powder. The mixed powder was put in an agitation mixer together with a resin binder, water, and additives, and kneaded to obtain a slurry. The slurry was then used to form sensing sheets each having a given thickness, for example, of 100 μm by a doctor blade method. Three thus formed sensing sheets are laminated together to obtain a sensing lamination 3S. It should be noted that the number and thickness of the sensing sheets used to form the sensing lamination 3S had been determined considering the shrinkage of the sensing sheets that is to occur in the forthcoming sintering process.

Next, as materials for forming the first and second insulating layers 2 and 4, a first powder of $ZrO_2$ and a second powder of AlN were prepared. The first and the second powders were then processed in the same way as the mixed powder for the sensing layer 3. Specifically, those powders were respectively kneaded, together with a resin binder, water, and additives, in an agitation mixer so as to obtain a slurry. Using the respectively obtained first and second slurries, first and second insulating sheets each having a given thickness, for example, of 100 μm were respectively formed by a doctor blade method. Three of thus formed first insulating sheets are laminated together to form a first insulating lamination 2S, and three second insulating sheets are also laminated together to form a second sensing lamination 4S. The number and thickness of the first and second insulating sheets to form the insulating laminations 2S and 4S had also been determined considering the shrinkage of those insulating sheets to occur in forthcoming sintering process.

It should be noted that the three layers 2S, 3S, and 4S have the same thickness of 300 μm in FIG. 13; however, the three layers may have different thickness, for example, of 600 μm, 300 μm, and 100 μm, respectively.

In Step 2, the sensing lamination 3S and the first and second insulating laminations 2S and 4S were stacked, as shown in FIG. 13, to form a multi lamination structure 1S in which the sensing lamination 3S is sandwiched between the two insulating laminations 2S and 4S. Thereafter, the multi lamination structure 1S underwent thermocompression process by, for example, a hot press; it was then fired in a furnace to remove the resin binders through thermal decomposition. After CIP (Cold Hydrostatic Press), the multi lamination structure 1S was sintered in a sintering furnace under a given condition, for example the temperature of 1500° C. and the time period of 4 hours. As a consequence, a multilayer structure was obtained which consists of three integrally sintered layers, i.e., the first insulating layer 2, the sensing layer 3, and the second insulating layer 4.

In Step 3, the multilayer structure was cut into multilayer blocks each of which constitutes a physical quantity sensing element 1 that has a given size, for example, of 5 mm×5 mm×0.8 mm.

Additionally, predetermined portions of the first insulating layer 2 may be cut away from the physical quantity sensing element 1 so as to provide terminals 5 on the accordingly exposed areas of the major face of the sensing layer 3 on which the first insulating layer 2 is disposed.

Thus obtained physical quantity sensing element 1 was then joined to the case 10 made of AlN by, for example, adhesive agent. Thereafter, the circuit chip 12 was mounted on the case 10, and the terminals 11 were formed to make electrical connection of the sensor 100 with external circuits or devices.

It is preferable that the circuit chip 12 is in bare die form without being formed by resin molding.

The circuit chip 12, the terminal ends 11a, and the terminals 5 of the sensing element 1 were then electrically connected by, for example, wire bonding 6.

As a result, the physical quantity sensor 100 according to invention was obtained.

While the above particular embodiments of the invention have been shown and described, it will be understood by those who practice the invention and those skilled in the art that various modifications, changes, and improvements may be made to the invention without departing from the spirit of the disclosed concept. Such modifications, changes, and improvements within the skill of the art are intended to be covered by the appended claims.

What is claimed is:

1. A physical quantity sensor comprising:
   a first member;
   a second member;
   a sensing member interposed in contact between said first and said second members, said sensing member being configured to generate an electrical signal as a function of a physical quantity applied thereto through one of said first and said second members;
   a temperature detector detecting a temperature of said sensing member;
   a correcting circuit correcting the electrical signal generated by said sensing member using the temperature detected by said temperature detector and outputting the corrected electrical signal; and
   a heat conduction path thermally connecting said sensing member and said temperature detector, said heat conduction path being formed through said second member such that said second member has a thermal resistance along said thermal conduction path which is less than a thermal resistance of said first member in an application direction of the physical quantity, wherein
   said second member is made of a material having a thermal conductivity higher than that of a material of which said first member is made.

2. The physical quantity sensor as set forth in claim 1, wherein said second member has a thickness in the application direction of the physical quantity less than that of said first member.

3. The physical quantity sensor as set forth in claim 2, wherein a space between said sensing member and said temperature detector is filled with a sealing material.

4. The physical quantity sensor as set forth in claim 3, wherein said correcting circuit comprises a temperature detecting element that serves as said temperature detector of the physical quantity sensor.

5. The physical quantity sensor as set forth in claim 4, wherein said first and said second members are each made mainly of a ceramic material.

6. The physical quantity sensor as set forth in claim 5, wherein said sensing member is made mainly of a ceramic material and a piezoresistive material.

7. The physical quantity sensor as set forth in claim 6, wherein an ohmic resistance of said sensing member changes as a function of the physical quantity applied to said sensing member, and wherein said sensing member generates the electrical signal depending on the change in the ohmic resistance of said sensing member.

8. A physical quantity sensor comprising:
   a first member;
   a second member;
   a sensing member interposed in contact between said first and said second members, said sensing member being configured to generate an electrical signal as a function of a physical quantity applied thereto through one of said first and said second members;

a temperature detector detecting a temperature of said sensing member;

a correcting circuit correcting the electrical signal generated by said sensing member using the temperature detected by said temperature detector and outputting the corrected electrical signal; and a heat conduction path thermally connecting said sensing member and said temperature detector, said heat conduction path being formed through said second member such that said second member has a thermal resistance along said thermal conduction path which is less than a thermal resistance of said first member in an application direction of the physical quantity, wherein said first and said second members are each made mainly of a ceramic material, said sensing member is made mainly of a ceramic material and a piezoresistive material, and both said sensing member and said first member are made mainly of zirconia, and said second member is made mainly of at least one of alumina and aluminum nitride.

9. The physical quantity sensor as set forth in claim 8, wherein said first and said second members each comprise an insulating layer disposed on a surface of said sensing member, and the insulating layer of said second member has a thickness in the application direction of the physical quantity less than that of the insulating layer of said first member, and wherein the insulating layer of said second member is made of zirconia.

10. The physical quantity sensor as set forth in claim 9, wherein the piezoresistive material, of which said sensing member is mainly made, is $La_{1-x}Sr_xMnO_3$ ($0 \leq x \leq 1$).

11. The physical quantity sensor as set forth in claim 8, wherein the piezoresistive material, of which said sensing member is mainly made, is $La_{1-x}Sr_xMnO_3$ ($0 \leq x \leq 1$).

* * * * *